April 29, 1952  D. C. BAILEY  2,594,717
GLASS RUN CHANNEL FOR VEHICLE WINDOWS
Filed Feb. 28, 1948
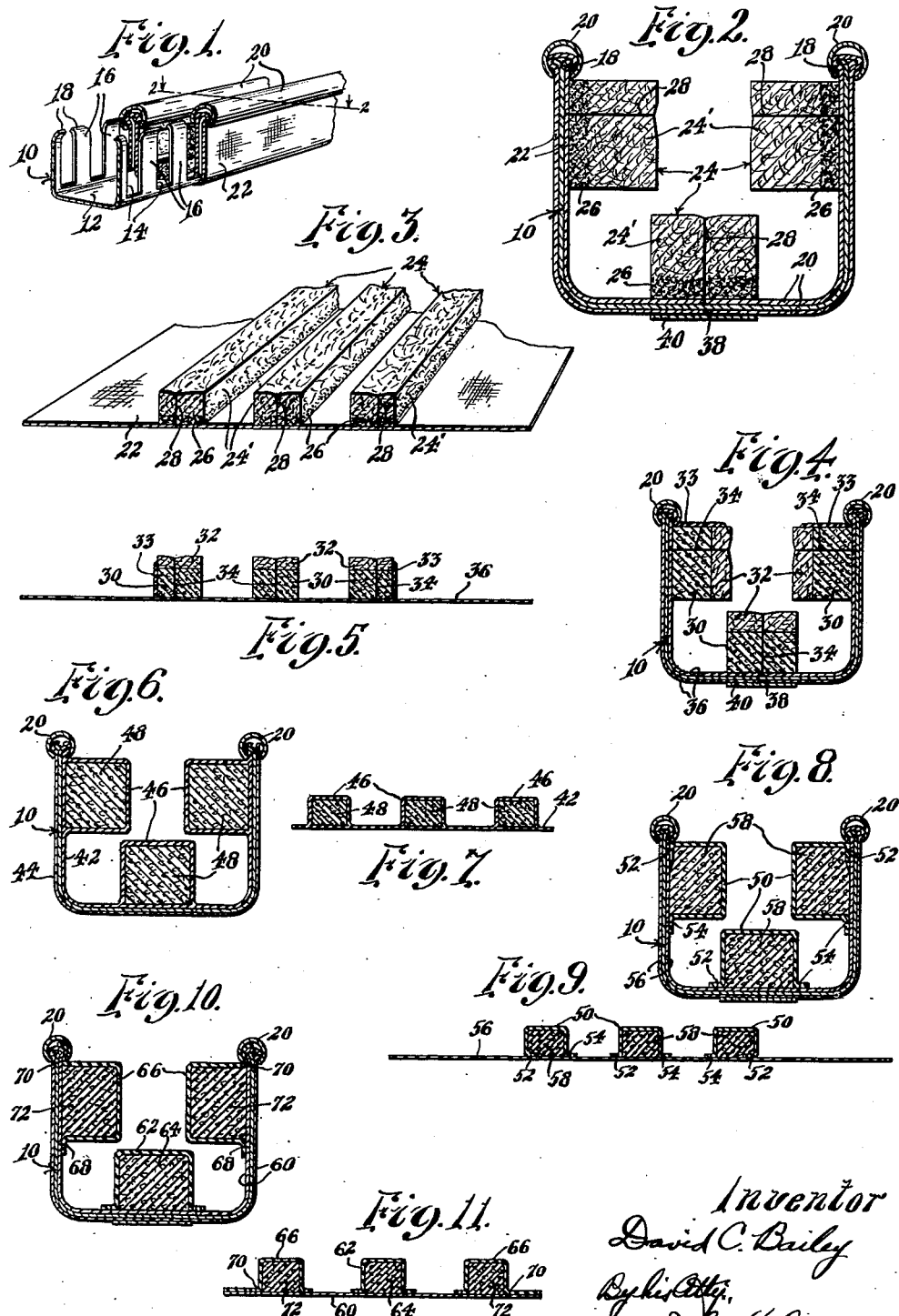

Patented Apr. 29, 1952

2,594,717

UNITED STATES PATENT OFFICE 2,594,717

GLASS RUN CHANNEL FOR VEHICLE WINDOWS

David C. Bailey, Amesbury, Mass., assignor to The Bailey Company, Inc., Amesbury, Mass., a corporation of Massachusetts Application February 28, 1948, Serial No. 11,901

1 Claim. (Cl. 296—44.5)

This invention relates to improvements in glass run channels for the windows of vehicles and the like. More particularly it provides improvements in such channels of the general type wherein a sheet metal core channel is covered by fabric or other suitable sheet material, and wherein the opposite side walls of the covered channel, and the bottom wall thereof, each has a cushioning strip mounted thereon, within the channel, for resiliently engaging a window glass all around the window opening.

Glass run channels of the referred to general type ordinarily have their oppositely disposed side cushioning strips located and adapted to engage opposite surface portions of the glass with a resilient pressure capable of steadying the glass and preventing chattering and rattling thereof. Heretofore, however, it has been customary to form the cushioning strips, at least in large part, of felt in its natural state as received from the felt mill, although sometimes the natural felt has been superficially coated with a moisture-repellant substance such as aluminum acetate. But, in use of the prior cushioning strips in glass run channels, where the strips are exposed to the elements, the felt becomes wet and frequently swells to twice its initial size and imposes an impracticable amount of pressure on the associated window glass which makes it difficult to move the glass and sometimes even locks the glass against any movement. This condition has been aggravated by the inherent difficulty the felt manufacturer encounters in meeting customer specifications as to thickness of the felt. In trying to avoid going under a specified thickness, the felt is apt to run over the specified thickness, in which case it has been customary to calender the felt to a proper thickness. Calendered felt, when wet, swells substantially more than non-calendered felt. Hence, the channel manufacturer has been confronted with the problem of controlling the swelling characteristic of the felt which may vary considerably in different pieces.

Also, the prior channel run cushioning strips have been of a nature to absorb and hold substantial amounts of moisture long after termination of a rainstorm, for example, and this retained moisture not infrequently has resulted in failure of the sheet metal core channel, due to corrosion.

It is among the objects of my present invention to provide glass run channels whose cushioning strips include moisture-resistant material whereby each strip as a whole is rendered materially less subject to swelling when exposed to water. I provide a cushioning pad construction and a mounting means therefor whereby needed resiliency coupled with an adequate resistivity to moisture ensure an operable coaction between the cushion strips and the glass in both wet and dry weather.

Another object is to provide glass run channels whose cushioning strips resist transfer of moisture from the cushioning strips to the metal core channels whereby corrosion of the core channels is minimized, and their useful life materially prolonged.

A further object is to provide a glass run channel for vehicle windows and the like wherein the major thickness of each channel cushioning strip may be of resilient moisture-resistant material, and wherein the moisture-resistant material is effectively covered by a facing material integral with or mounted on a core-covering fabric sheet.

It is, moreover, my purpose and object generally to improve the construction and operative effectiveness and durability of glass run channels, and more especially such channels of the general type wherein a sheet metal core channel has a covering of fabric and cushioning strips mounted on the covering fabric within the channel.

In the accompanying drawing:

Fig. 1 is a perspective view of a section of glass run channel embodying features of the invention, portions being broken away to show the sheet metal core channel, the exposed end of which is in cross-section;

Fig. 2 is a cross-sectional view on line 2—2 of Fig. 1;

Fig. 3 is a perspective cross-sectional view of a fragment of the core covering sheet of Figs. 1 and 2, in spread condition, and with the cushioning strips secured thereon;

Fig. 4 is a view similar to Fig. 2 but showing a modified form of cushioning strips;

Fig. 5 is a cross-sectional view of the core covering sheet of Fig. 4, in spread condition, with the cushioning strips secured thereon;

Fig. 6 is a view similar to Figs. 2 and 4 but showing another modified form in which the inner and outer surfaces of the sheet metal core are covered by separate sheet elements of which the inner sheet element is woven or braided to provide longitudinal pockets which are filled with resilient moisture-resistant cushioning material;

Fig. 7 is a cross-sectional view of the inner core-facing sheet of Fig. 6, in spread condition, and with the cushioning material in its pockets;

Fig. 8 is a view similar to Figs. 2, 4 and 6 but showing still another modification;

Fig. 9 is a cross-sectional view of the core-covering sheet of Fig. 8, in spread condition, and with the cushioning strips secured thereon;

Fig. 10 is a cross-sectional view of a glass run channel having yet another modified form of cushioning strip securement; and Fig. 11 is a cross-sectional view of the inner core-facing sheet of Fig. 10, in spread condition, and with the cushioning strips secured thereon.

Referring to the drawing, the particular glass run channels herein represented may have any suitable stabilizing core channel 10, preferably of sheet metal, which may be constructed, as best seen in Fig. 1, with an imperforate bottom wall 12 and deeply grooved side walls whose grooves 14 facilitate bending and shaping of the channels around a window opening. The core material between the grooves 14 is in the form of spaced arms 16, the free ends of which are bent slightly as at 18, with the bend in successive arms alternately in opposite directions, thereby to provide end projections back of which the usual metal bead strips 20 may engage when the bead strips are applied along the edges of the channel. It should be understood, however, that other channel core constructions may be employed, such as known types having imperforate corrugated side walls.

Before the metal bead strips 20 are applied, the core channel is covered and provided with interior cushioning strips, and the invention has to do with improvements in the covering for the core, and in the cushioning strips and their embodiment within the channel.

In the form of the invention illustrated in Figs. 1-3, a single sheet 22 of fabric has the three similar cushioning strips 24 secured on one side thereof in suitably spaced parallelism.

Each cushioning strip comprises a substantial thickness of resilient felt 24', or the like, for resiliently engaging the glass of a window, and this resilient felt portion 24' is backed by a moisture-proof or moisture-resistant portion 26 which intervenes between the resilient felt 24' and the fabric sheet 22. Each strip is stitched, as at 28, to the fabric sheet 22. The strip portion 26 may be a thickness of the initial felt strip impregnated with a water insoluble resin or other comparable moisture resistive substance to a degree which will render the impregnated material moisture-proof or substantially so. However, a mere coating of the resin intervening between the felt strip and sheet 22 greatly minimizes the swelling of the felt although not to the extent that the impregnated form of Figs. 2 and 3 accomplishes it. Hence, in Figs. 2 and 3, the portion 26 of each cushioning strip 24 should be considered as representing a thickness of the initial felt strip impregnated with a moisture-proofing material and also as indicating a mere coating of the felt with a moisture-proofing material without any substantial penetration of the proofing material into the felt.

Heretofore, the cushioning strips, when wet, would expand or swell to such an extent that they frequently gripped the glass with a pressure which locked the glass against movement, or made its movement impractically difficult. Apparently the compacted fibres of the felt, pressed under heat in a moist state at the felt mill, and then dried, become fairly stably set in their compacted condition so long as the felt continues dry. But when the compacted felt gets wet, the individual fibres become softened and lose their set, and the matted and inter-locked fibres swell and slip relatively to produce an over-all swelling of a strip or sheet frequently causing a one hundred percent increase in its thickness. I have discovered that cushioning strips having a substantial body portion of moisture-resistant material 26 intervening between the fabric sheet 22 and the resilient strip portion 24' effectively reduces the swelling of the strips so that the glass readily can be moved to open and close a window even when the absorbent portions 24' of the strips have been subjected to a thorough wetting, the portions 24' having thickness capable of providing needed resilience both under wet and dry conditions. Actual tests have demonstrated that my improved cushioning strips of Figs. 2 and 3, when impregnated with a water insoluble resin, as herein described, reduces swelling of the strips, when wet, to approximately five percent as against the mentioned one hundred percent swell of an untreated felt cushioning strip. Actual tests have shown also that a mere coating of the resin, or of latex, applied to the surface of the felt next to the fabric sheet 22 reduces swelling to as little as twenty-five percent. Also, the moisture-resistant portion 26 minimizes the transfer of moisture to the covering fabric 22 and thence to the metal core 10, which tends to reduce corrosion of the core and to prolong its effective useful life.

Figs. 4 and 5 illustrate another cushioning strip construction in which the major thickness of each strip is of sponge rubber 30. A relatively thin strip of felt 32, or the like, covers that surface of the sponge rubber which is toward the glass space of the channel, the composite strips being stitched as at 34 to the covering fabric 36. In this case, the surfaces of the sponge rubber adjacent to the metal bead strips 20 preferably are faced with a thin layer of flock 33 or the like.

In both the Figs. 2 and 3 and the Figs. 4 and 5 forms, the covering fabric extends all around the core channel 10 and has its opposite edges brought together or butted at 38 at the outer surface of the imperforate bottom wall 12 of the core channel, and their juncture is covered by a relatively narrow fabric strip 40 cemented to the fabric 22. It should be understood that the covering fabric 22 adheres to the metal core by reason of adhesive applied either to the fabric or to the metal, as is well known in the art.

The Figs. 4 and 5 form is in some respects more effective than the Figs. 2 and 3 form because of the permissible greater thickness of the moisture-resistant material which, in the Figs. 4 and 5 form, is also resilient. Hence, a relatively thin strip of felt 32 can constitute the surface portion of each composite strip, for engaging the glass. Also the sponge rubber character of the major thickness of each composite strip considerably reduces the amount of moisture that can be retained by any composite strip, with a consequent substantial reduction of tendency to swell.

Other practical embodiments having sponge rubber as the dominant material of the channel cushioning strips are represented in Figs. 6-11. In Fig. 6, separate fabric sheets 42, 44 cover the inner and outer surfaces of the metal core channel 10, the opposite side edges of the two sheets being located within the metal bead strips 20.

In this case, the inner sheet 42 is woven or braided to provide the integral longitudinal pockets 46 in which sponge rubber strips 48 are located, so that the woven or braided pocket material covers the rubber surfaces. The sponge rubber strips may be inserted in the pre-braided or pre-woven pockets, or the walls of the pockets may be braided or woven around the rubber strips. Obviously, any other suitably resilient moisture-resistant material, such as jute fibre, for example, in its natural state or treated to make it adequately moisture-resistant, may be substituted for the sponge rubber in the pockets.

Figs. 8 and 9 illustrate a construction in which fabric longitudinal pockets 50 consist of separate strips of fabric stitched at 52, 54 to a single core-covering fabric sheet 56. In this form, the sponge rubber 58, or other resilient moisture-resistant material, may be inserted in the pockets after stitching of the pocket material, or the rubber may be positioned after a pocket strip has been stitched at 52, after which the pocket strip may be wrapped around the rubber prior to stitching it at 54. Obviously, the pocket strip extending along the bottom wall of the channel may be stitched first at either 52 or 54.

In the Figs. 10 and 11 form, a single fabric sheet 60 covers the metal core channel as in the Figs. 2, 4 and 6 forms, and the bottom pocket strip 62 is stitched to the sheet 60 as in the Fig. 8 form, and has sponge rubber 64 filling the pocket. The side pocket strips 66, however, are stitched to the sheet 60 along one edge as at 68, and the opposite edge portion of each cover strip 66 extends into one of the metal bead strips 20, and is clamped thereby as well as being stitched at 70 to the sheet 60. Sponge rubber 72 fills the side pockets as previously described.

In all of the various illustrated forms of the invention, a major portion of the total thickness of each cushioning strip is resilient for providing a desired cushioned grip on the glass of a window, thereby to effectively avoid rattling and chattering of the glass as a result of vehicle vibrations, and each includes means whereby each cushioning strip is in part moisture-resistant to an extent which avoids such expansion or swelling of the cushioning strips, when subjected to wetting, as would cause locking of the glass against movement, or make operative movements of the glass impracticably difficult. Because my improved cushioning strips are themselves of a character to absorb and retain less moisture, and because they minimize the transfer of moisture to the metal core channel, glass run channels embodying my invention can have substantially longer practical useful lives as compared with comparable structures of the prior art.

While I have shown and described my improved cushioning strips and mounting sheets as applied to core channels having bead strips 20 applied to the edges of the channels, the various features of structural and operational advantage inherent in the disclosed invention are applicable to channels which may have no separate bead strips, and which may have corrugated core channels with rolled edges or with fabric-covered edges. In other words, my disclosed invention is applicable to core channels of various well known constructions for covering the core channels and for mounting therein cushioning strips having the character that they have greatly reduced tendency to swell when wet, as compared with the prior channel strips.

Any of the many suitable moisture-resistant substances which are available may be employed for impregnating or coating the felt strips, or the like, in the form of the invention illustrated in Figs. 2 and 3. Latex has been used with satisfactory results and, particularly, pre-vulcanized latex. The latter has demonstrated a fibre-restraining character superior to un-vulcanized latex in that it conditions the cushioning strips so that their swelling when wet is substantially less than comparable strips impregnated or coated with un-vulcanized latex. Water-resisting and water-repellant resins, both natural and synthetic may be employed with good results. Cumarone resin varnish, and shellac, are mentioned as suitable resinous substances that may be employed, although selection may be made from a large number of resinous substances, solutions or mixtures which are well known as having the required moisture-resistant character and which readily may be impregnated in or coated on the material of the cushioning strips.

I claim as my invention:

In a glass run channel having a sheet metal core channel and having fabric sheet material adhered to the surfaces of the core channel in completely enclosing relation thereto, partially impregnated cushioning strips secured to said fabric sheet material within the channel, one said strip extending along one side wall of the channel, and another extending along the opposite side wall of the channel, and a third extending along the bottom wall of the channel, each said cushioning strip being formed of felt, and each having a substance impregnating the felt adjacent the fabric sheet to which the strips are secured and confined to that one third of the total thickness of the strip which is next adjacent to said fabric sheet, said substance rendering the impregnated portions of the strips substantially impervious to moisture and the major thickness of the strips being free of the said substance for resilient cushioning coaction with a window glass.

DAVID C. BAILEY.

REFERENCES CITED

The following references are of record in the file of this patent:

UNITED STATES PATENTS

| Number | Name | Date |
| --- | --- | --- |
| 1,772,912 | Randall | Aug. 12, 1930 |
| 2,055,833 | Bailey | Sept. 29, 1936 |
| 2,191,549 | Spraragen | Feb. 27, 1940 |
| 2,433,333 | Best | Dec. 30, 1947 |
| 2,446,516 | Bailey | Aug. 10, 1948 |

FOREIGN PATENTS

| Number | Country | Date |
| --- | --- | --- |
| 355,964 | Great Britain | Sept. 3, 1931 |